US010095470B2

(12) United States Patent
Lang et al.

(10) Patent No.: US 10,095,470 B2
(45) Date of Patent: Oct. 9, 2018

(54) AUDIO RESPONSE PLAYBACK

(71) Applicant: Sonos, Inc., Santa Barbara, CA (US)

(72) Inventors: Jonathan P. Lang, Santa Barbara, CA (US); Mark Plagge, Santa Barbara, CA (US)

(73) Assignee: SONOS, INC., Santa Barbara, CA (US)

( * ) Notice: Subject to any disclaimer, the term of this patent is extended or adjusted under 35 U.S.C. 154(b) by 84 days.

(21) Appl. No.: 15/237,133

(22) Filed: Aug. 15, 2016

(65) Prior Publication Data

US 2017/0242651 A1 Aug. 24, 2017

Related U.S. Application Data

(60) Provisional application No. 62/298,418, filed on Feb. 22, 2016, provisional application No. 62/312,350, filed on Mar. 23, 2016, provisional application No. 62/298,388, filed on Feb. 22, 2016, provisional application No. 62/298,410, filed on Feb. 22, 2016, provisional application No. 62/298,425, filed on Feb. 22, 2016, provisional application No. 62/298,350, filed on Feb. 22, 2016.

(51) Int. Cl.

| | |
|---|---|
| ***G06F 3/16*** | (2006.01) |
| ***G10L 15/18*** | (2013.01) |
| ***H04R 27/00*** | (2006.01) |
| *G10L 15/22* | (2006.01) |

(52) U.S. Cl.

CPC .............. *G06F 3/165* (2013.01); *G06F 3/167* (2013.01); *G10L 15/1822* (2013.01); *H04R 27/00* (2013.01); *G10L 2015/223* (2013.01); *H04R 2227/003* (2013.01); *H04R 2227/005* (2013.01)

(58) Field of Classification Search

None

See application file for complete search history.

(56) References Cited

U.S. PATENT DOCUMENTS

| | | | |
|---|---|---|---|
| 4,741,038 | A | 4/1988 | Elko et al. |
| 4,941,187 | A | 7/1990 | Slater |
| 5,440,644 | A | 8/1995 | Farinelli et al. |
| 5,740,260 | A | 4/1998 | Odom |
| 5,761,320 | A | 6/1998 | Farinelli et al. |
| 5,923,902 | A | 7/1999 | Inagaki |
| 6,032,202 | A | 2/2000 | Lea et al. |

(Continued)

FOREIGN PATENT DOCUMENTS

| | | | |
|---|---|---|---|
| AU | 2017100486 | A4 | 6/2017 |
| AU | 2017100581 | A4 | 6/2017 |

(Continued)

OTHER PUBLICATIONS

US 9,299,346, 03/2016, Hart et al. (withdrawn)

(Continued)

*Primary Examiner* — Paul Huber

(57) ABSTRACT

A voice command may be received from a microphone device associated with a media playback system comprising one or more zones. An audio response zone from the one or more zones to play the audio response may be selected based on context information. The selected zone may comprise one or more playback devices. At least one playback device of the one or more playback devices of the selected zone may be caused to play the audio response.

17 Claims, 7 Drawing Sheets

(56) References Cited

U.S. PATENT DOCUMENTS 6,256,554 B1 7/2001 DiLorenzo
6,301,603 B1 10/2001 Maher et al.
6,311,157 B1 10/2001 Strong
6,404,811 B1 6/2002 Cvetko et al.
6,469,633 B1 10/2002 Wachter
6,522,886 B1 2/2003 Youngs et al.
6,594,347 B1 7/2003 Calder et al.
6,611,537 B1 8/2003 Edens et al.
6,631,410 B1 10/2003 Kowalski et al.
6,757,517 B2 6/2004 Chang
6,778,869 B2 8/2004 Champion
7,130,608 B2 10/2006 Hollstrom et al.
7,130,616 B2 10/2006 Janik
7,143,939 B2 12/2006 Henzerling
7,236,773 B2 6/2007 Thomas
7,295,548 B2 11/2007 Blank et al.
7,391,791 B2 6/2008 Balassanian et al.
7,483,538 B2 1/2009 McCarty et al.
7,571,014 B1 8/2009 Lambourne et al.
7,630,501 B2 12/2009 Blank et al.
7,643,894 B2 1/2010 Braithwaite et al.
7,657,910 B1 2/2010 McAulay et al.
7,661,107 B1 2/2010 Van Dyke et al.
7,702,508 B2 4/2010 Bennett
7,792,311 B1 9/2010 Holmgren et al.
7,853,341 B2 12/2010 McCarty et al.
7,987,294 B2 7/2011 Bryce et al.
8,014,423 B2 9/2011 Thaler et al.
8,041,565 B1 10/2011 Bhardwaj et al.
8,045,952 B2 10/2011 Qureshey et al.
8,073,125 B2 12/2011 Zhang et al.
8,103,009 B2 1/2012 Mccarty et al.
8,234,395 B2 7/2012 Millington et al.
8,239,206 B1 8/2012 Lebeau et al.
8,255,224 B2 8/2012 Singleton et al.
8,290,603 B1 10/2012 Lambourne
8,364,481 B2 1/2013 Strope et al.
8,386,261 B2 2/2013 Mellott et al.
8,423,893 B2 4/2013 Ramsay et al.
8,428,758 B2 4/2013 Naik et al.
8,453,058 B1 5/2013 Coccaro et al.
8,483,853 B1 7/2013 Lambourne
8,484,025 B1 7/2013 Moreno et al.
8,831,761 B2 9/2014 Kemp et al.
8,831,957 B2 9/2014 Taubman et al.
8,938,394 B1 1/2015 Faaborg et al.
8,942,252 B2 1/2015 Balassanian et al.
8,983,383 B1 3/2015 Haskin
8,983,844 B1 3/2015 Thomas et al.
9,042,556 B2 5/2015 Kallai et al.
9,094,539 B1 7/2015 Noble
9,215,545 B2 12/2015 Dublin et al.
9,251,793 B2 2/2016 Lebeau et al.
9,253,572 B2 2/2016 Bedingfield, Sr. et al.
9,262,612 B2 2/2016 Cheyer
9,288,597 B2 3/2016 Carlsson et al.
9,300,266 B2 3/2016 Grokop
9,318,107 B1 4/2016 Sharifi
9,319,816 B1 4/2016 Narayanan
9,412,392 B2 8/2016 Lindahl et al.
9,426,567 B2 8/2016 Lee et al.
9,431,021 B1 8/2016 Scalise et al.
9,443,527 B1 9/2016 Watanabe et al.
9,472,201 B1 10/2016 Sleator
9,472,203 B1 10/2016 Ayrapetian et al.
9,484,030 B1 11/2016 Meaney et al.
9,489,948 B1 11/2016 Chu et al.
9,494,683 B1 11/2016 Sadek
9,509,269 B1 11/2016 Rosenberg
9,514,752 B2 12/2016 Sharifi
9,536,541 B2 1/2017 Chen et al.
9,548,066 B2 1/2017 Jain et al.
9,552,816 B2 1/2017 Vanlund et al.
9,560,441 B1 1/2017 McDonough, Jr. et al.
9,601,116 B2 3/2017 Casado et al.
9,615,170 B2 4/2017 Kirsch et al.
9,615,171 B1 4/2017 O'Neill et al.
9,632,748 B2 4/2017 Faaborg et al.
9,633,186 B2 4/2017 Ingrassia, Jr. et al.
9,633,368 B2 4/2017 Greenzeiger et al.
9,633,660 B2 4/2017 Haughay et al.
9,633,671 B2 4/2017 Giacobello et al.
9,633,674 B2 4/2017 Sinha et al.
9,640,179 B1 5/2017 Hart et al.
9,640,183 B2 5/2017 Jung et al.
9,641,919 B1 5/2017 Poole et al.
9,646,614 B2 5/2017 Bellegarda et al.
9,653,060 B1 5/2017 Hilmes et al.
9,653,075 B1 5/2017 Chen et al.
9,659,555 B1 5/2017 Hilmes et al.
9,672,821 B2 6/2017 Krishnaswamy et al.
9,685,171 B1 6/2017 Yang
9,691,378 B1 6/2017 Meyers et al.
9,691,379 B1 6/2017 Mathias et al.
9,697,826 B2 7/2017 Sainath et al.
9,697,828 B1 7/2017 Prasad et al.
9,698,999 B2 7/2017 Mutagi et al.
9,704,478 B1 7/2017 Vitaladevuni et al.
9,721,568 B1 8/2017 Polansky et al.
9,721,570 B1 8/2017 Beal et al.
9,728,188 B1 8/2017 Rosen et al.
9,734,822 B1 8/2017 Sundaram et al.
9,747,011 B2 8/2017 Lewis et al.
9,747,899 B2 8/2017 Pogue et al.
9,747,920 B2 8/2017 Ayrapetian et al.
9,747,926 B2 8/2017 Sharifi et al.
9,754,605 B1 9/2017 Chhetri
9,762,967 B2 9/2017 Clarke et al.
9,811,314 B2 11/2017 Plagge et al.
9,813,810 B1 11/2017 Nongpiur
9,820,036 B1 11/2017 Tritschler et al.
9,820,039 B2 11/2017 Lang
9,826,306 B2 11/2017 Lang
9,881,616 B2 1/2018 Beckley et al.
2001/0042107 A1 11/2001 Palm
2002/0022453 A1 2/2002 Balog et al.
2002/0026442 A1 2/2002 Lipscomb et al.
2002/0034280 A1 3/2002 Infosino
2002/0072816 A1 6/2002 Shdema et al.
2002/0124097 A1 9/2002 Isely et al.
2003/0040908 A1 2/2003 Yang et al.
2003/0072462 A1 4/2003 Hlibowicki
2003/0157951 A1 8/2003 Hasty
2004/0024478 A1 2/2004 Hans et al.
2005/0164664 A1 7/2005 DiFonzo et al.
2005/0195988 A1 9/2005 Tashev et al.
2005/0268234 A1 12/2005 Rossi, Jr. et al.
2005/0283330 A1 12/2005 Laraia et al.
2006/0147058 A1 7/2006 Wang
2006/0190968 A1 8/2006 Jung et al.
2006/0247913 A1 11/2006 Huerta et al.
2006/0262943 A1 11/2006 Oxford
2007/0018844 A1 1/2007 Sutardja
2007/0019815 A1 1/2007 Asada et al.
2007/0033043 A1 2/2007 Hyakumoto
2007/0071255 A1 3/2007 Schobben
2007/0076131 A1 4/2007 Li et al.
2007/0140058 A1 6/2007 McIntosh et al.
2007/0142944 A1 6/2007 Goldberg et al.
2008/0090537 A1 4/2008 Sutardja
2008/0248797 A1 10/2008 Freeman et al.
2008/0301729 A1 12/2008 Broos et al.
2009/0003620 A1 1/2009 McKillop et al.
2009/0005893 A1 1/2009 Sugii et al.
2009/0018828 A1 1/2009 Nakadai et al.
2009/0076821 A1 3/2009 Brenner et al.
2009/0197524 A1 8/2009 Haff et al.
2009/0228919 A1 9/2009 Zott et al.
2009/0238377 A1 9/2009 Ramakrishnan et al.
2009/0326949 A1 12/2009 Douthitt et al.
2010/0014690 A1 1/2010 Wolff et al.
2010/0023638 A1 1/2010 Bowman
2010/0075723 A1 3/2010 Min et al.
2010/0179874 A1 7/2010 Higgins et al.

(56) References Cited

U.S. PATENT DOCUMENTS

2010/0211199 A1 8/2010 Naik et al.
2011/0033059 A1 2/2011 Bhaskar et al.
2011/0091055 A1 4/2011 Leblanc
2011/0145581 A1 6/2011 Malhotra et al.
2011/0267985 A1 11/2011 Wilkinson et al.
2011/0276333 A1 11/2011 Wang et al.
2011/0280422 A1 11/2011 Neumeyer et al.
2011/0299706 A1 12/2011 Sakai
2012/0131125 A1 5/2012 Seidel et al.
2012/0148075 A1 6/2012 Goh et al.
2012/0163603 A1 6/2012 Abe et al.
2012/0177215 A1 7/2012 Bose et al.
2012/0297284 A1 11/2012 Matthews, III et al.
2013/0006453 A1 1/2013 Wang et al.
2013/0024018 A1 1/2013 Chang et al.
2013/0058492 A1 3/2013 Silzle et al.
2013/0066453 A1 3/2013 Seefeldt
2013/0148821 A1 6/2013 Sorensen
2013/0179173 A1 7/2013 Lee et al.
2013/0183944 A1 7/2013 Mozer et al.
2013/0191122 A1 7/2013 Mason
2013/0216056 A1 8/2013 Thyssen
2013/0317635 A1 11/2013 Bates et al.
2013/0329896 A1 12/2013 Krishnaswamy et al.
2013/0331970 A1* 12/2013 Beckhardt .............. G06F 3/165 700/94
2013/0332165 A1 12/2013 Beckley et al.
2013/0343567 A1* 12/2013 Triplett ............ H04N 21/41407 381/77
2014/0003611 A1 1/2014 Mohammad et al.
2014/0003635 A1 1/2014 Mohammad et al.
2014/0006026 A1 1/2014 Lamb et al.
2014/0064501 A1 3/2014 Olsen et al.
2014/0075306 A1 3/2014 Rega
2014/0094151 A1 4/2014 Klappert et al.
2014/0100854 A1 4/2014 Chen et al.
2014/0167931 A1 6/2014 Lee et al.
2014/0195252 A1 7/2014 Gruber et al.
2014/0244013 A1 8/2014 Reilly
2014/0258292 A1 9/2014 Thramann et al.
2014/0270282 A1 9/2014 Tammi et al.
2014/0274185 A1 9/2014 Luna et al.
2014/0277650 A1 9/2014 Zurek et al.
2014/0363022 A1 12/2014 Dizon et al.
2015/0010169 A1 1/2015 Popova et al.
2015/0016642 A1 1/2015 Walsh et al.
2015/0063580 A1 3/2015 Huang et al.
2015/0086034 A1 3/2015 Lombardi et al.
2015/0104037 A1 4/2015 Lee et al.
2015/0154976 A1 6/2015 Mutagi
2015/0180432 A1 6/2015 Gao et al.
2015/0189438 A1 7/2015 Hampiholi et al.
2015/0200454 A1 7/2015 Heusdens et al.
2015/0222987 A1 8/2015 Angel, Jr. et al.
2015/0228274 A1 8/2015 Leppänen et al.
2015/0253292 A1 9/2015 Larkin et al.
2015/0253960 A1 9/2015 Lin et al.
2015/0271593 A1 9/2015 Sun et al.
2015/0280676 A1 10/2015 Holman et al.
2015/0296299 A1 10/2015 Klippel et al.
2015/0302856 A1 10/2015 Kim et al.
2015/0341406 A1 11/2015 Rockefeller et al.
2015/0363061 A1 12/2015 de Nigris, III et al.
2015/0363401 A1 12/2015 Chen et al.
2015/0371657 A1 12/2015 Gao et al.
2015/0380010 A1 12/2015 Srinivasan
2016/0007116 A1 1/2016 Holman
2016/0021458 A1 1/2016 Johnson et al.
2016/0029142 A1 1/2016 Isaac
2016/0036962 A1 2/2016 Rand et al.
2016/0042748 A1 2/2016 Jain et al.
2016/0057522 A1 2/2016 Choisel et al.
2016/0077710 A1 3/2016 Lewis et al.
2016/0088392 A1 3/2016 Huttunen et al.
2016/0093304 A1 3/2016 Kim et al.
2016/0098393 A1 4/2016 Hebert
2016/0157035 A1 6/2016 Russell et al.
2016/0173578 A1 6/2016 Sharma et al.
2016/0212538 A1 7/2016 Fullam et al.
2016/0225385 A1 8/2016 Hammarqvist
2016/0232451 A1 8/2016 Scherzer
2016/0234204 A1 8/2016 Rishi et al.
2016/0239255 A1 8/2016 Chavez et al.
2016/0260431 A1 9/2016 Newendorp et al.
2016/0314782 A1 10/2016 Klimanis
2016/0352915 A1 12/2016 Gautama
2016/0353218 A1* 12/2016 Starobin ................ H04R 27/00
2017/0003931 A1 1/2017 Dvortsov et al.
2017/0026769 A1 1/2017 Patel
2017/0060526 A1 3/2017 Barton et al.
2017/0070478 A1 3/2017 Park et al.
2017/0076720 A1 3/2017 Gopalan et al.
2017/0078824 A1 3/2017 Heo
2017/0084292 A1 3/2017 Yoo
2017/0090864 A1 3/2017 Jorgovanovic
2017/0092278 A1 3/2017 Evermann et al.
2017/0092297 A1 3/2017 Sainath et al.
2017/0103755 A1 4/2017 Jeon et al.
2017/0125037 A1 5/2017 Shin
2017/0177585 A1 6/2017 Rodger et al.
2017/0178662 A1 6/2017 Ayrapetian et al.
2017/0193999 A1 7/2017 Aleksic et al.
2017/0206896 A1 7/2017 Ko et al.
2017/0214996 A1 7/2017 Yeo
2017/0236512 A1 8/2017 Williams et al.
2017/0242651 A1 8/2017 Lang et al.
2017/0242653 A1 8/2017 Lang et al.
2017/0270919 A1 9/2017 Parthasarathi et al.
2017/0353789 A1 12/2017 Kim et al.
2018/0033428 A1 2/2018 Kim et al.

FOREIGN PATENT DOCUMENTS

EP 1349146 A1 10/2003
EP 1389853 A1 2/2004
EP 2351021 B1 9/2017
JP 2001236093 A 8/2001
JP 2004347943 A 12/2004
JP 2004354721 A 12/2004
JP 2005284492 A 10/2005
JP 2008079256 A 4/2008
JP 2008158868 A 7/2008
JP 2010141748 A 6/2010
JP 2013037148 A 2/2013
JP 2014071138 A 4/2014
JP 2014137590 A 7/2014
KR 20100111071 A 10/2010
WO 200153994 7/2001
WO 2003093950 A2 11/2003
WO 2015037396 A1 3/2015
WO 2015178950 A1 11/2015
WO 2016033364 A1 3/2016
WO 2017039632 A1 3/2017

OTHER PUBLICATIONS

European Patent Office, European Extended Search Report dated Oct. 30, 2017, issued in connection with EP Application No. 17174435.2, 11 pages.

Final Office Action dated Oct. 6, 2017, issued in connection with U.S. Appl. No. 15/098760, filed Apr. 14, 2016, 25 pages.

Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.

Freiberger, Karl, "Development and Evaluation of Source Localization Algorithms for Coincident Microphone Arrays," Diploma Thesis, Apr. 1, 2010, 106 pages.

International Searching Authority, International Search Report and Written Opinion dated Nov. 22, 2017, issued in connection with International Application No. PCT/US2017/054063, filed on Sep. 28, 2017, 11 pages.

(56) References Cited

OTHER PUBLICATIONS

International Searching Authority, International Search Report and Written Opinion dated Oct. 23, 2017, issued in connection with International Application No. PCT/US2017/042170, filed on Jul. 14, 2017, 15 pages.
International Searching Authority, International Search Report and Written Opinion dated Oct. 24, 2017, issued in connection with International Application No. PCT/US2017/042227, filed on Jul. 14, 2017, 16 pages.
Morales-Cordovilla et al. "Room Localization for Distant Speech Recognition," Proceedings of Interspeech 2014, Sep. 14, 2014, 4 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Oct. 26, 2017, issued in connection with U.S. Appl. No. 15/438,744, filed Feb. 21, 2017, 12 pages.
Notice of Allowance dated Dec. 4, 2017, issued in connection with U.S. Appl. No. 15/277,810, filed Sep. 27, 2016, 5 pages.
Notice of Allowance dated Dec. 13, 2017, issued in connection with U.S. Appl. No. 15/784,952, filed Oct. 16, 2017, 9 pages.
Notice of Allowance dated Dec. 15, 2017, issued in connection with U.S. Appl. No. 15/223,218, filed Jul. 29, 2016, 7 pages.
Notice of Allowance dated Dec. 29, 2017, issued in connection with U.S. Appl. No. 15/131,776, filed Apr. 18, 2016, 13 pages.
Tsiami et al. "Experiments in acoustic source localization using sparse arrays in adverse indoors environments", 2014 22nd European Signal Processing Conference, Sep. 1, 2014, 5 pages.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Mao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Non-Final Office Action dated Dec. 12, 2016, issued in connection with U.S. Appl. No. 15/098,718, filed Apr. 14, 2016, 11 pages.
Non-Final Office Action dated Jan. 13, 2017, issued in connection with U.S. Appl. No. 15/098,805, filed Apr. 14, 2016, 11 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Final Office Action dated Aug. 11, 2017, issued in connection with U.S. Appl. No. 15/131,776, filed Apr. 18, 2016, 7 pages.
Non-Final Office Action dated Sep. 14, 2017, issued in connection with U.S. Appl. No. 15/178,180, filed Jun. 9, 2016, 16 pages.
Non-Final Office Action dated Sep. 6, 2017, issued in connection with U.S. Appl. No. 15/131,254, filed Apr. 18, 2016, 13 pages.
Notice of Allowance dated Aug. 14, 2017, issued in connection with U.S. Appl. No. 15/098,867, filed Apr. 14, 2016, 10 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Aug. 22, 2017, issued in connection with U.S. Appl. No. 15/273,679, filed Sep. 22, 2016, 5 pages.
Corrected Notice of Allowability dated Mar. 8, 2017, issued in connection with U.S. Appl. No. 15/229,855, filed Aug. 5, 2016, 6 pages.
Final Office Action dated Jun. 20, 2017, issued in connection with U.S. Appl. No. 15/098,718, filed Apr. 14, 2016, 15 pages.
International Searching Authority, International Search Report and Written Opinion dated May 23, 2017, issued in connection with International Application No. PCT/US2017/018739, Filed on Feb. 21, 2017, 10 pages.
International Searching Authority, International Search Report and Written Opinion dated May 30, 2017, issued in connection with International Application No. PCT/US2017/018728, Filed on Feb. 21, 2017, 11 pages.
Non-Final Office Action dated Jun. 1, 2017, issued in connection with U.S. Appl. No. 15/223,218, filed Jul. 29, 2016, 7 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Apr. 19, 2017, issued in connection with U.S. Appl. No. 15/131,776, filed Apr. 18, 2016, 12 pages.
Non-Final Office Action dated Jul. 25, 2017, issued in connection with U.S. Appl. No. 15/273,679, filed Jul. 22, 2016, 11 pages.
Non-Final Office Action dated Jan. 26, 2017, issued in connection with U.S. Appl. No. 15/098,867, filed Apr. 14, 2016, 16 pages.
Non-Final Office Action dated Jun. 30, 2017, issued in connection with U.S. Appl. No. 15/277,810, filed Sep. 27, 2016, 13 pages.
Notice of Allowance dated Jul. 12, 2017, issued in connection with U.S. Appl. No. 15/098,805, filed Apr. 14, 2016, 8 pages.
Notice of Allowance dated Feb. 14, 2017, issued in connection with U.S. Appl. No. 15/229,855, filed Aug. 5, 2016, 11 pages.
Notice of Allowance dated Jun. 14, 2017, issued in connection with U.S. Appl. No. 15/282,554, filed Sep. 30, 2016, 11 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, 1 Dec. 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
"Denon 2003-2004 Product Catalog," Denon, 2003-2004, 44 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/438,725, filed Feb. 21, 2017, 15 pages.
Non-Final Office Action dated Mar. 16, 2018, issued in connection with U.S. Appl. No. 15/681,937, filed Aug. 21, 2017, 5 pages.

(56) References Cited

OTHER PUBLICATIONS

Non-Final Office Action dated Apr. 18, 2018, issued in connection with U.S. Appl. No. 15/811,468 filed Nov. 13, 2017, 14 pages.
Non-Final Office Action dated Feb. 20, 2018, issued in connection with U.S. Appl. No. 15/211,748, filed Jul. 15, 2016, 31 pages.
Non-Final Office Action dated May 22, 2018, issued in connection with U.S. Appl. No. 15/946,599, filed Apr. 5, 2018, 19 pages.
Non-Final Office Action dated Feb. 6, 2018, issued in connection with U.S. Appl. No. 15/211,689, filed Jul. 15, 2016, 32 pages.
Non-Final Office Action dated Apr. 9, 2018, issued in connection with U.S. Appl. No. 15/804,776, filed Nov. 6, 2017, 18 pages.
Non-Final Office Action dated May 9, 2018, issued in connection with U.S. Appl. No. 15/818,051, filed Nov. 20, 2017, 22 pages.
Notice of Allowance dated Apr. 11, 2018, issued in connection with U.S. Appl. No. 15/719,454, filed Sep. 28, 2017, 15 pages.
Notice of Allowance dated Mar. 20, 2018, issued in connection with U.S. Appl. No. 15/784,952, filed Oct. 16, 2017, 7 pages.
Notice of Allowance dated Jan. 22, 2018, issued in connection with U.S. Appl. No. 15/178,180, filed Jun. 9, 2016, 9 pages.
Notice of Allowance dated Mar. 9, 2018, issued in connection with U.S. Appl. No. 15/584,782, filed May 2, 2017, 8 pages.

* cited by examiner

AUDIO RESPONSE PLAYBACK

CROSS-REFERENCE

This application claims the benefit of priority under 35 USC § 119(e) to U.S. Provisional Application Ser. No. 62/298,418 filed on Feb. 22, 2016 and entitled "AUDIO RESPONSE PLAYBACK", U.S. Provisional Application Ser. No. 62/312,350 filed on Mar. 23, 2016 and entitled "VOICE CONTROL OF A MEDIA PLAYBACK SYSTEM", U.S. Provisional Application Ser. No. 62/298,425 filed on Feb. 22, 2016 and entitled "MUSIC SERVICE SELECTION", U.S. Provisional Application Ser. No. 62/298,350 filed on Feb. 22, 2016 and entitled "METADATA EXCHANGE INVOLVING A NETWORKED PLAYBACK SYSTEM AND A NETWORKED MICROPHONE SYSTEM", U.S. Provisional Application Ser. No. 62/298,388 filed on Feb. 22, 2016 and entitled "HANDLING OF LOSS OF PAIRING BETWEEN NETWORKED DEVICES", and U.S. Provisional Application Ser. No. 62/298,410 filed on Feb. 22, 2016 and entitled "DEFAULT PLAYBACK DEVICE(S)", the contents each of which are herein incorporated by reference in their entireties.

This application is also related to U.S. Provisional Application Ser. No. 62/298,439 filed on Feb. 22, 2016 and entitled "CONTENT MIXING", U.S. Provisional Application Ser. No. 62/298,433 filed on Feb. 22, 2016 and entitled "ROOM-CORRECTED VOICE DETECTION", and U.S. Provisional Application Ser. No. 62/298,393 filed on Feb. 22, 2016 and entitled "ACTION BASED ON USER ID", the contents each of which are herein incorporated by reference in their entireties.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
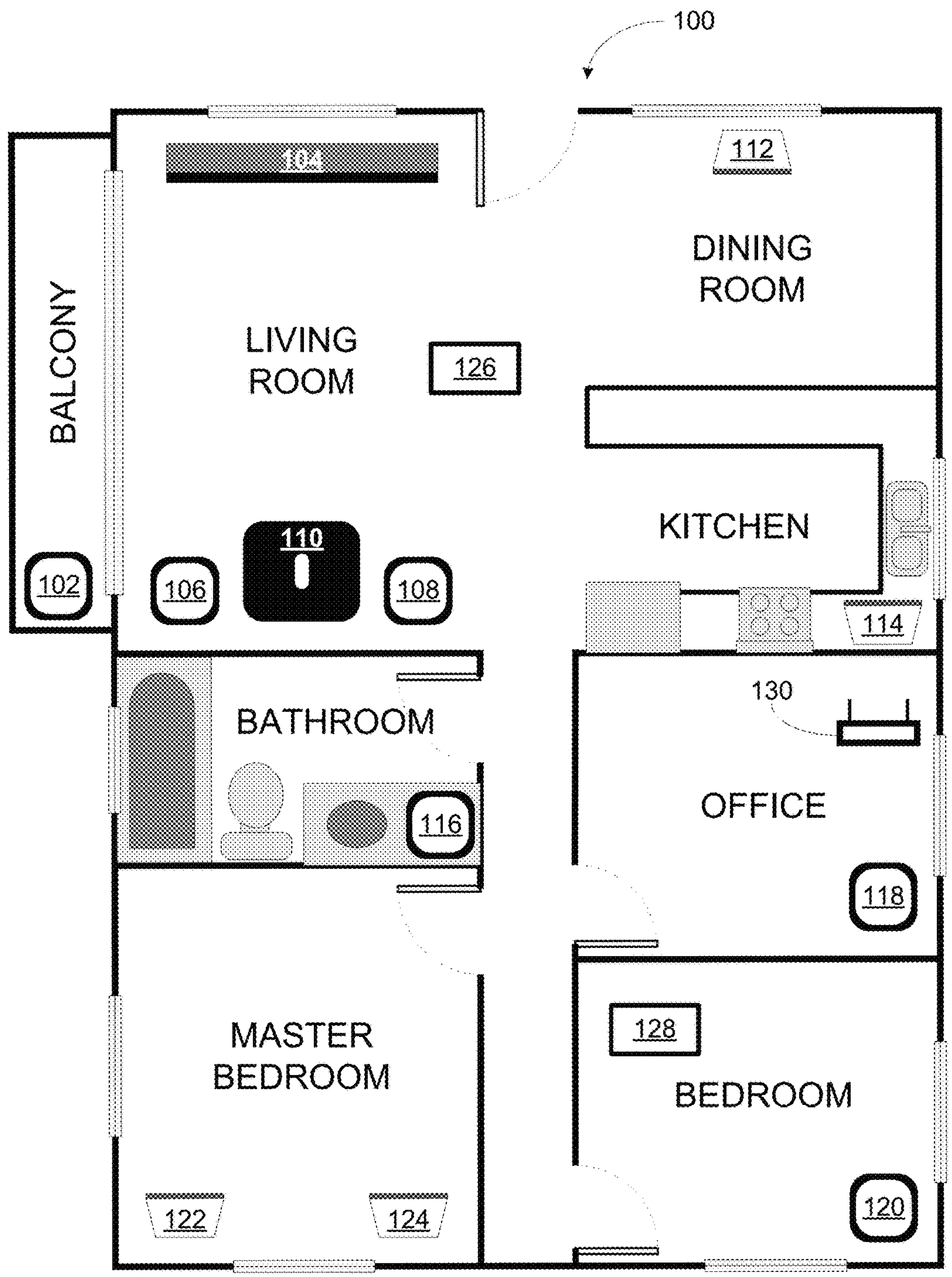
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some embodiments described herein involve playing an audio response to a voice command in a media playback system and selecting a response device or zone to play the audio response to the voice command. In one embodiment, the response device or zone may be predetermined, and in another embodiment, the response device or zone may be dynamically selected based on context information.

As indicated above, the examples provided herein involve determining one or more devices or zone(s) to play an audio response to a voice command in a media playback system. In one aspect, a method is provided. The method may involve receiving a voice command from a microphone device associated with a media playback system. The media playback system may include one or more zones. At least one playback device of the one or more playback devices or at least one zone may be selected to play the audio response based on at least one of pairing information or capabilities of the zone, and the selected at least one playback device or zone is caused to play the audio response.

In another aspect, a non-transitory computer-readable medium is provided. The non-transitory computer readable medium has stored thereon instructions executable by a computing device to cause the computing device to perform functions. The functions include receiving a voice command from a microphone device associated with a media playback system, and the media playback system may include one or more zones, selecting at least one playback device of the one or more playback devices or a zone to play the audio response based on context information, and causing the selected at least one playback device or zone to play the audio response.

In yet another aspect, an apparatus is provided. The apparatus includes a processor and a memory. The memory has stored thereon instructions executable by the apparatus to cause the apparatus to perform functions. The functions include receiving a voice command via a microphone device assigned to a zone which includes one or more playback devices, selecting at least one playback device of the one or more playback devices to play the audio response based on at least one of pairing information or capabilities of the zone, and causing the selected at least one playback device to play the audio response.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
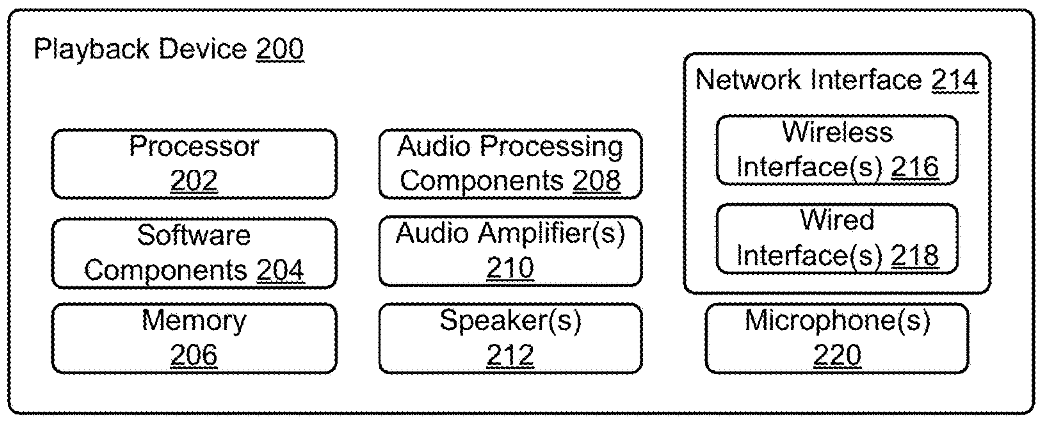
FIG. 2 shows a functional block diagram of an example playback device according to aspects described herein.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
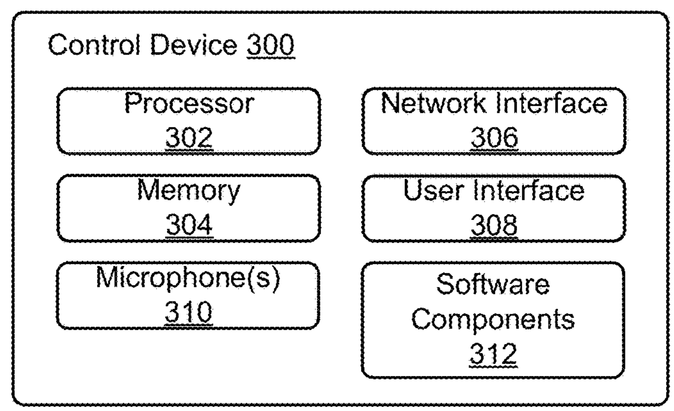
FIG. 3 shows a functional block diagram of an example control device according to aspects described herein.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
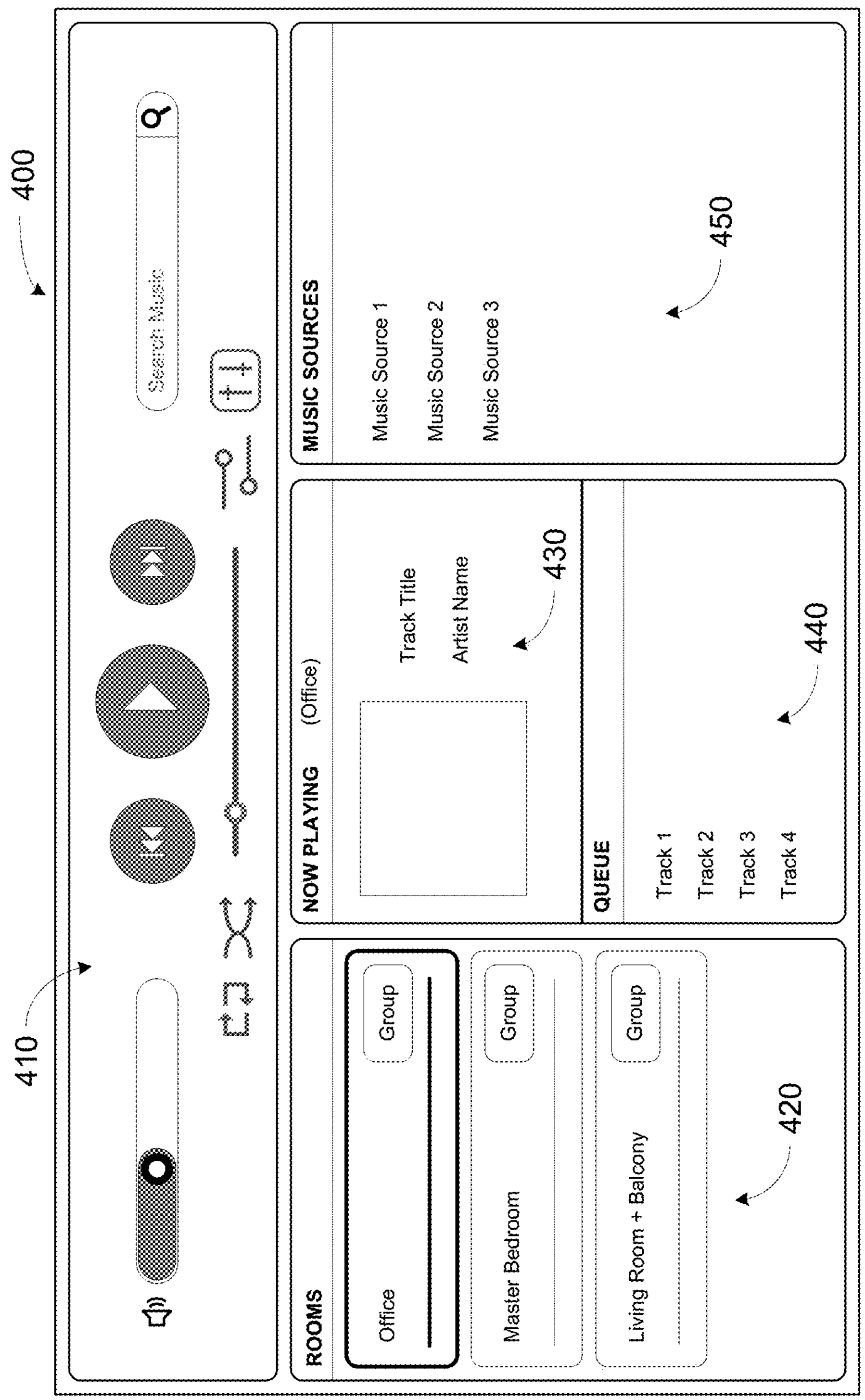
FIG. 4 shows an example controller interface according to aspects described herein.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a “group” icon may be provided within each of the graphical representations of playback zones. The “group” icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
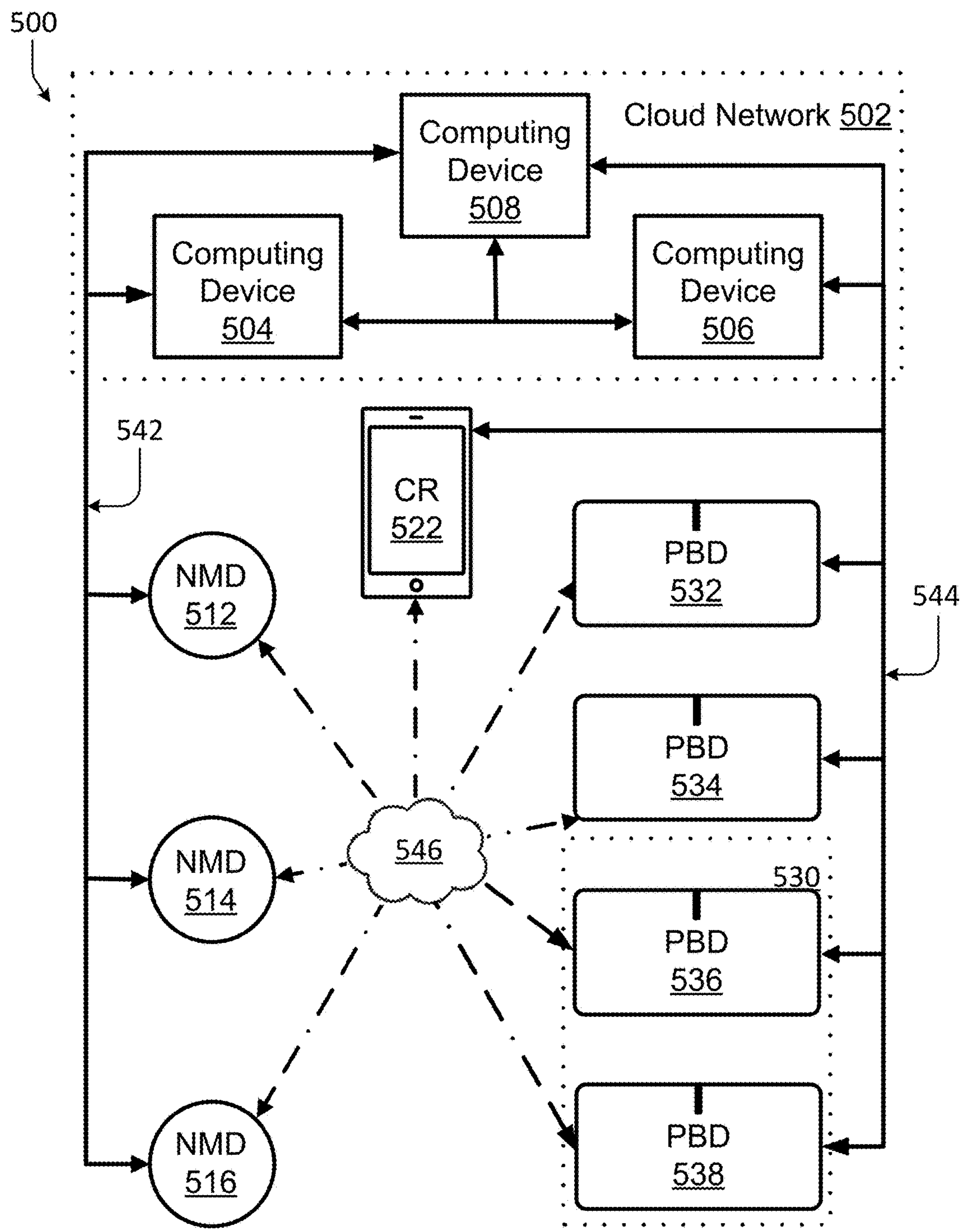
FIG. 5 shows an example plurality of network devices according to aspects described herein.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
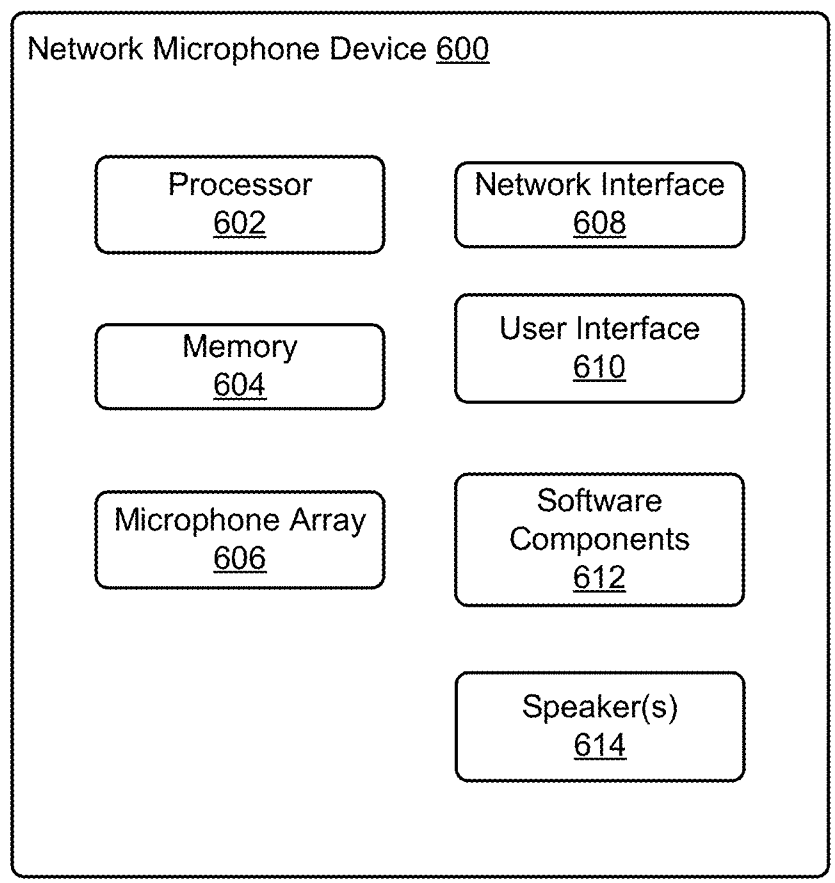
FIG. 6 shows a function block diagram of an example network microphone device according to aspects described herein.

FIG. 6 shows a function block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Method of Playing an Audio Response

Figure 7:
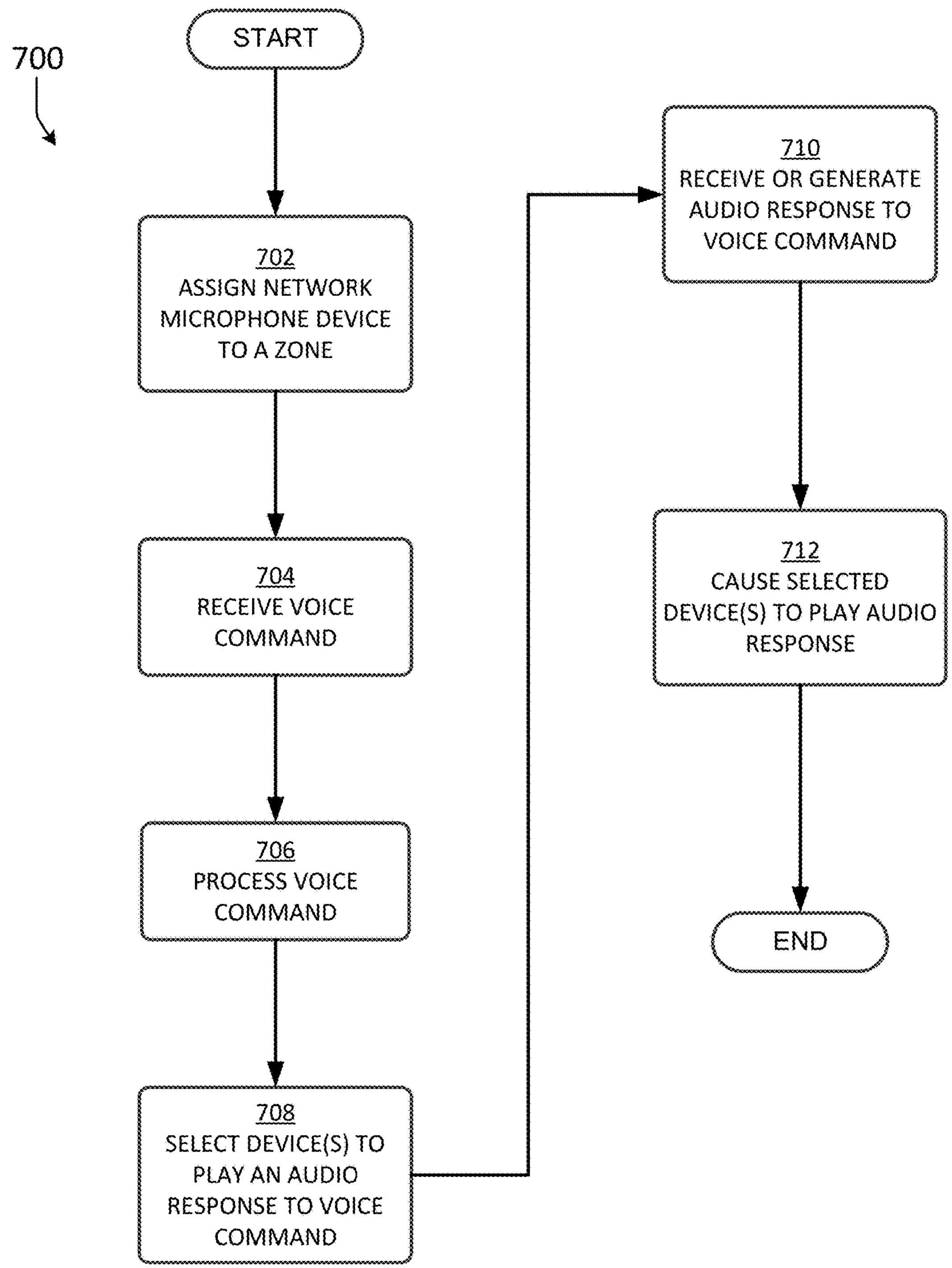
FIG. 7 shows a flow diagram of an example method of playing an audio response according to aspects described herein.
Figure 8:
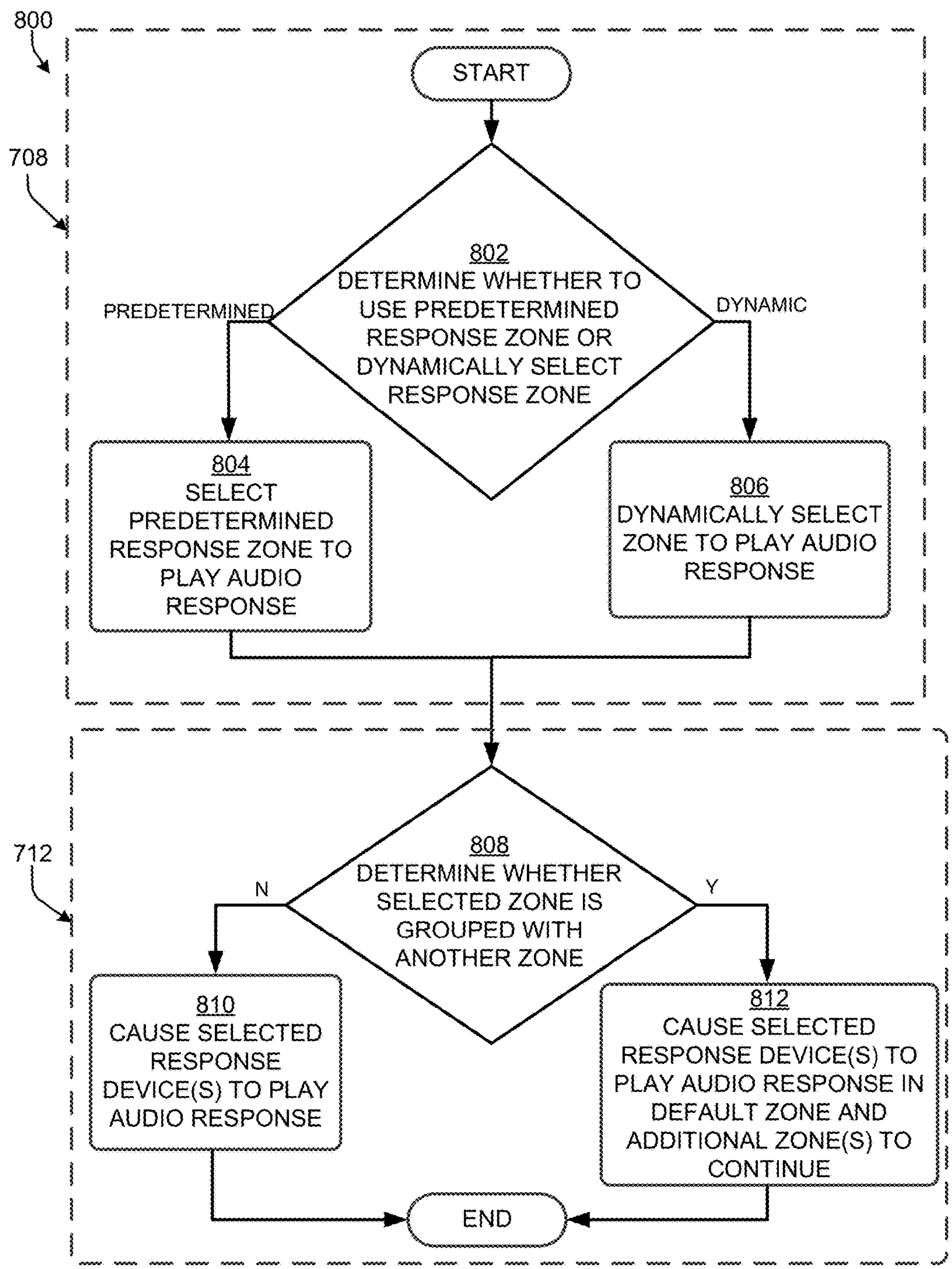
FIG. 8 shows a flow diagram of blocks 708 and 712 of FIG. 7 in more detail according to aspects described herein.

As discussed above, embodiments described herein may involve playing back an audio response to a voice command. FIG. 7 shows an example flow diagram 700 of a method for playing an audio response, and FIG. 8 shows an example flow diagram 800 presenting aspects of blocks 708 and 712 of FIG. 7 in more detail. Methods 700 and 800 present embodiments of methods that can be implemented within an operating environment involving, for example, the media playback system 100 of FIG. 1, one or more of the playback device 200 of FIG. 2, one or more of the control device 300 of FIG. 3, and one or more of the plurality of devices in system 500 of FIG. 5. Methods 700 and 800 may include one or more operations, functions, or actions. Although the blocks in FIGS. 7 and 8 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 700 and 800 and other processes and methods disclosed herein, the flow diagrams show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 700 and 800 and other processes and methods disclosed herein, each block in FIGS. 7 and 8 may represent circuitry that is wired to perform the specific logical functions in the process.

As discussed above, FIG. 7 depicts a flow diagram of a method 700 for playing an audio response. At block 702 of method 700, a network microphone device 512, 514, 516 may be assigned (e.g., paired or bonded) to a zone comprising one or more playback devices such as playback devices 532, 534, 536, 538. Network microphone devices may be assigned to a zone as described in the application identified as U.S. Provisional Application No. 62/298,410 entitled Default Playback Device(s), the contents of which is hereby incorporated by reference in its entirety. At block 704, a user may provide a voice command to one or more devices of the plurality of devices 500 which contain a microphone (e.g., NMD 512, 514, 516, PBD 532, 534, 536, 538, CR 522). The one or more microphone devices may pass the voice command to other devices of the plurality or system of devices 500 (e.g., one or more computing devices 504, 506, 508 in cloud network 502, NMD 512, 514, 516, PBD 532, 534, 536, 538) for processing. At block 706, the one or more processing devices may process the voice command and return a response to be played back. The response to be played back may be returned in the form of a voice response message comprising the audio clip to be played, text to be converted to speech, and/or an identifier (e.g., URL or URI) of a pre-recorded response to be played that may be stored locally on a device of system 500). The response may be returned via one or more communication paths 542, 544, 546.

At block 708, system 500 may select one or more devices or one or more zones to play the voice response. The determination or selection of which one or more devices or zones to play the voice response may depend on a variety of factors including context information, pairing information, and/or user settings. Block 708 will be discussed in more detail with respect to FIG. 8.

At block 710, system 500 may receive the voice response message indicating the response to play. Block 710 may occur before, in conjunction with, or after block 708. At block 712, the system 500 may cause the one or more device(s) selected in block 708 to play the voice response. The default zone may be grouped for synchronous playback with another zone and playback of the audio response may be adjusted based on the grouping which will be described in more detail with respect to FIG. 8.

FIG. 8 shows an illustrative flow diagram of selecting one or more zones or devices (e.g., individual device, zone comprising one or more devices) to play the voice response to the voice command according to aspects described herein. At block 802, a computing device (e.g., NMD, playback device, control device, computing device) can determine whether to use a predetermined response device (e.g., default PBD) or zone (e.g., default zone) or dynamically select a response device or zone to play the voice response. A predetermined response device or zone may be determined during initial system setup or configuration (e.g., assignment, pairing, bonding) when adding new devices to system 500. For example, initial setup or configuration may be to add a new playback device to system 500 and/or to add or assign a new NMD to a zone (e.g., default zone). The predetermined response device may be selected by the user and/or automatically selected by the system 500. A response device or zone may be dynamically selected based on various information such as context information (e.g., location information, orientation information, presence information) which may include pairing information (e.g., pairing dependent on location of a user, pairing dependent on location of microphone device), and/or capability information (e.g., available sensors, available devices, available networks, available processing power).

The decision of whether to use a predetermined device or to dynamically select an audio response device may be based on the capabilities of system 500 to dynamically select a response device and/or for an efficient determination of the response device. Certain devices and/or hardware may be used in order to make a dynamic selection, and if the certain devices and/or hardware are not available to participate in the dynamic selection, system 500 may default to using a predetermined response device. For example, the system 500 might not have the capability to determine location information related to the user's position and/or the position of a microphone device (e.g., NMD, PBD, CR) receiving or having responsibility of processing a voice command spoken by the user, and/or the system 500 might not have previously determined location information of devices in system 500. In such an example, a determination to use a predetermined device may be the most expedient avenue to provide the user with an immediate acknowledgement or response to the voice command. As another example, the system 500 may lack hardware such as a sensor, camera, or other input device which can be used to determine context information (e.g., location information, presence information, etc.). In this instance, the system 500 may decide to use a predetermined response device (e.g., default zone, default playback device). As yet another example, the system 500 may have only one zone in which case the system can automatically determine to set the one zone as the default zone and/or to use the one zone for all audio responses. Similarly, the system 500 may have only a single PBD. In view of this, the system may select to use the single PBD as the default device and/or predetermined audio response device.

In some instances, location information may be determined or processed by transmitting information detected by devices in the system 500 to cloud network 502 for processing via communication paths 542, 544, and/or 546. Cloud network 502 may possess more processing power than the devices NMD 512, 514, 516, CR 522, and PBD 532, 534, 536, 538. In the event the cloud network 502 is not available, the system 500 may use one of the predetermined devices and may defer to a user's preferences stored in a user profile for the specific predetermined device (e.g., default response device) to speak or play an audio response. In some aspects, the location information may be processed locally by one or more of the NMDs, CRs, PBDs.

If the system 500 has determined at block 802 to select one or more predetermined response devices or zones to play the audio response to the voice command, method 800 may proceed to block 804. If the system 500 has determined at block 802 to dynamically select one or more response devices to play the audio response, method 800 may proceed to block 806.

At block 804, a processing device (e.g., any of the plurality of devices 500) may determine to select a predetermined zone or one or more predetermined devices. For example, a user may designate one or more devices or one or more zones to play the audio response to any voice command during initial setup or configuration (e.g., assignment, pairing or bonding), and the user designation may be saved as a default setting in a user profile associated with the user. The user profile may be stored in any device of the plurality of devices 500. In response to receiving a voice command, the receiving device or any other device in system 500 may retrieve the user profile stored locally or in another device to determine which predetermined speaker(s) or zone(s) of playback device(s) to use as the device(s) to play the audio response to the voice command.

In one example, a network microphone device may include a speaker, and the speaker of the networked microphone device may be used to play the voice response.

In another aspect, a speaker in an audio response device (e.g., NMD(s), playback device(s), control device) may be configured during initial setup with the NMD to play audio responses. For example, a user may select a particular device in the default zone to be a default response device. In other instances, the default zone may include one playback device, and the one playback device may be identified as the default response device. In some other instances, the default zone may include more than one playback device, and a user may select one of the playback devices or two or more of the playback devices as the default response device.

In some aspects, the zone to playback an audio response may be a bonded zone (e.g., bonded zone 530) including two or more playback devices (e.g., PBDs 536, 538). In a bonded zone, the audio response may be played by one or more the playback devices in the bonded zone, and which of the playback devices of the bonded zone play the audio may depend on the type of playback devices. For example, the bonded zone may include a surround sound system where playback devices may be placed at different locations around a user and be responsible for playing one or more channels of audio. In this arrangement, the playback devices may be placed both in front of and behind the user. Based on the orientation of the user to the PBDs, the PBD(s) in front of the user may be selected to play the audio response.

In some aspects, the NMD may be usually stationary such that a relative location may be configured during initial setup. In one aspect, a user may identify a response device nearest to the NMD. The response device may be part of the default zone or another zone. In another aspect, the response device nearest to the NMD may be identified automatically by nearby response devices and/or the NMD. For example, proximity detection may be performed using the microphone(s) of the nearby response devices and/or NMD. For example, one or more playback devices in the default zone may emit or play a predetermined tone. The predetermined tone may be played at the same power level or volume at each playback device. The microphone(s) of the NMD may receive the test tone and determine based on highest power level which playback device is closest to the NMD.

In some aspects, the default response device may be determined based on orientation of the playback devices relative to the NMD. For example, playback devices which are facing towards the NMD may have higher priority to be the default response device over a playback device which is physically nearer to the NMD. Similar to using a test tone to determine a nearest playback device, a test tone picked up by the microphone(s) of the NMD may be used to determine orientation of playback devices relative to the NMD. The NMD may pick up or detect a tone played from a playback device positioned so that speakers facing towards the NMD detected more loudly or at a higher power than a speaker directed away from the NMD. Other techniques for proximity or location determination are possible including those described herein.

As another example, all playback devices may be selected to play the audio response to the voice command. For example, all playback devices in a default zone (e.g., zone to which the NMD is assigned) may play any or all audio responses which are responsive to an audio or voice command.

After determining one or more predetermined response devices, the method may proceed to block 808 and determine whether the default zone is grouped with another zone. The default zone may be grouped with another zone for synchronous playback of media items (e.g., audio content, video clips, radio).

Returning to block 806, the system 500 may dynamically select one or more response devices or one or more zones to play the audio response to the audio command. The dynamically selected audio response device(s) may be selected based on pairing information (e.g., NMD dynamic pairing based on user location and/or device location) and/or context information (e.g., orientation of user, context at time of the voice command, location information). The pairing information may be dependent on the context information. The dynamically selected device(s) may be selected independent of pairing information. The zone or device selected for the response may be the same or different from the device or zone to which the NMD is assigned.

As discussed above, a NMD may be paired or assigned to a zone or a device. The dynamically selected audio response device may be the device to which a NMD is paired where the pairing between the NMD and another device may change dynamically based on (e.g., change in response to a change in) a user's location which can be determined at any time, in response to a particular event (e.g., user requests a particular zone) and/or a location of the NMD relative to another device (e.g., NMD, PBD, CR). For example, at the time voice command is received or at the time the audio response is to be played to the user. The user's location may be determined using one or more of the plurality of devices 500 and various techniques. For example, microphones in two or more different devices of the plurality of devices 500 may be used in determining the location of the user relative to the two or more different devices.

Two or more different devices may be listening for a user's voice and determine a closest speaker by comparing a magnitude (e.g., volume, power level) of the user's voice and/or determining a delay or timing difference between when each of two or more different devices receives the user's voice. As an example, a first device (e.g., PBD 532) and a second device (e.g., PBD 534) may be located in the same zone as the user, and the microphones of these playback devices may be able to pickup the user's voice command. The devices may be able to record and/or analyze the user's speech or voice when the user speaks the voice command. The recording may be done by any of the devices 500 which include a microphone (e.g., NMD, PBD CR), and the analysis may be done by any of the devices of the plurality of devices 500. The analysis may include receiving the recorded user's speech or voice from one or more other devices and comparing based on timestamp and/or by spoken word and/or by syllable of the user's speech or other characteristic of the recording. In some aspects, the comparison may be performed after each word, syllable, and/or phrase and need not wait until the user has completed speaking the voice command.

The delay or timing difference between when different devices receive the sound of a user's voice may be indicative of a relative distance between the user and the receiving devices since devices closer to the user may receive the sound of the user's voice before devices further away from the user. For example, the two or more devices can each timestamp when certain sound characteristics or sound markers occur in the voice input and compare the timestamp to determine which of the two or more devices received the sound of the voice first. The two or more devices may maintain synchronized clocks and can directly compare timestamps of the sound characteristics to determine which device received the sound characteristic first. In some aspects, the two or more devices may determine a time difference between their respective clocks and compare the difference of the timestamps while subtracting the time difference between their respective clocks.

The recording or analysis of the user's speech may be performed by one or more devices and may be initiated by another device. For example, a NMD or other device containing a microphone (e.g., CR, PBD) may always be listening for a voice command, and when the NMD or other microphone device detects that the user has started speaking a command, the NMD may alert other microphone devices (e.g., NMD, CR, PBD) to begin receiving, recording, and/or analyzing the user's voice command by transmitting an alert (e.g., message) over a communication connection (e.g., 542, 544, 546) to other microphone devices which may or might not be in the same zone as the NMD.

Similarly, the analysis of the user's speech may be used to determine a user's orientation relative to the speaker. For example, a user may be facing towards a first speaker and have a second speaker directed to the user's back. In some instances, the system 500 may select the first speaker to play the audio response even though the user is closer to the second speaker since it may be desirable to have a speaker in front the of user play the audio response rather than a speaker behind the user. A microphone in a device (e.g., PBD, CR, NMD) in front of the user may pick up or detect a user's voice more loudly or at a higher power than a microphone in a device (e.g., PBD, CR, NMD) to the side or behind the user.

In some aspects, location information can include location of the microphone device (e.g., NMD, PBD, CR) relative to a speaker. For example, one or more playback devices in the default zone may emit or play a predetermined tone. The predetermined tone may be played at the same power level or volume at each playback device and/or may be within or outside a human hearing range (e.g., approximately 20 Hz to 20 kHz). The microphone(s) of the NMD may receive the test tone and determine based on highest power level which playback device is closest to the NMD.

In some aspects, NMD 512 may include a microphone array 606. Using the microphone array 606, the NMD may be able to generally identify direction, distance, and/or orientation of the user by determining which microphone(s) of microphone array 606 detects the loudest volume or highest power of the user's voice. In some aspects, the system or NMD 500 may have previously determined relative positions of playback devices and/or been programmed with relative positions of the playback devices, and the NMD may be able to use the microphones of the playback devices in combination with its own microphone(s) to determine general direction, distance, and/or orientation of a user using the user's voice when the voice command is spoken. Each determination of the user's location may be stored in one or more of the devices 500 and may be referenced in response to later voice commands for a quicker determination of a user's location and/or orientation.

Another technique for determining the location of the user may be to use interference and/or strength of wireless signals in an environment (e.g., location, zone). In some aspects, the location of the user may be determined based on wireless signals in an environment where the user and the PBD(s) and/or the NMD are located. The wireless signals may include wireless communication signals according to any wireless communication protocol such as an industry standard (e.g., IEEE 802.11a, 802.11b, 802.11g, 802.11n, 802.11ac, 802.15, Bluetooth, 4G mobile communication standard, LTE mobile communication standard, Bluetooth®, Near-Field Communications (NFC), etc.). The user may have a device (e.g., computing device, mobile device, wearable, tablet, etc.) which includes a wireless interface to transmit wireless communication signals according to a wireless communication protocol. The wireless signals emitted from the device may cause interference with other wireless signals present in the environment where the user is located. Based on the strength of the interference with other wireless signals, other devices which can detect the wireless signals and interference can determine a location of the user.

To determine the location of the user based on the strength of wireless signals in an environment, the user's device may measure the signal strength (e.g., received signal strength indicator (RSSI)) of a signal emitted by any wireless device in the environment with the user and identify the device with the strongest signal strength as the device nearest the user. Similarly, wireless device(s) (e.g., PBD, NMD, wireless router, beacon, NFC) in the environment can measure the signal strength of a wireless signal emitted by the user's device and transmit and/or collect signal strength measurements of the user device's wireless signal by other devices. The signal strength measurements may be collected and/or compared by any device in system 500, and the device with the strongest signal strength measurement can be identified as the device nearest to the user.

In some aspects, the NMD may become unpaired with a zone and re-paired with the zone. Such an unpairing may occur if the NMD leaves the environment associated with the media playback system (e.g., leaves the home environment, leaves the zone), moves outside of the range of a communication path (e.g., communication path 542, 544, and/or 546) (e.g., moves outside of wireless signal range of the communication paths), and/or disconnects from the communication path (e.g., disconnects from a network, logs out of a system or service, disables a communication interface, enters airplane mode). The NMD may later re-pair with the zone, for example, if the NMD returns to the environment associated with the media playback system (e.g., re-enters the home environment), returns to within range of a communication path (e.g., moves into wireless signal range of the communication paths), and/or reconnects to the communication path (e.g., establishes connection to a network, enables a communication interface, exits airplane mode).

As an example, a user may be carrying the NMD and may remove the NMD from the premises of the user's home. Consequentially, the NMD may lose connection with a zone or device to which the NMD was paired. The NMD may store this last-known connection or pairing and automatically attempt to re-connect or re-pair with this last-known connection or pairing upon returning to the user's home. In some aspects, the NMD may dynamically pair based on location information as described herein, and the dynamic pairing may occur automatically by the NMD once the NMD determines that the NMD is able to pair with a zone or device.

Any voice commands spoken by the user and received by the NMD while the NMD is unpaired may be processed and/or executed immediately or queued for processing and/or execution upon re-pairing, and any audio responses to the voice commands may be played on a dynamically selected device as described herein. For example, the user may play a playlist outside of the home and speak a voice command to continue playing the same playlist after returning home. The NMD may begin the processing of the voice command (e.g., begin processing locally, transmit to another device in system 500 for processing) prior to the user entering the home, prior to re-pairing with any devices or zones in the home, after entering the home, or after re-pairing with any devices or zones in the home. The audio response to the voice command may be played by the first zone or device with which the NMD is paired which may be according to dynamic pairing aspects described herein. The same un-pairing and re-pairing features may apply to a user or NMD moving between different zones. In shifting the pairing between different zones or un-pairing and re-pairing with a particular zone or device, state information of currently playing content or last-played content may be transferred with or separately from the pairing procedure.

In some instances, the voice command may include a particular zone in which to execute a command (e.g., play music in the Kitchen). In response to the request in the voice command of a particular zone (e.g., Kitchen), the NMD can automatically change its pairing to the Kitchen zone. A request for a particular zone in the voice command may override dynamic pairing selections that the NMD may have otherwise made based on the detected location of the user or NMD.

Other techniques to determine location information related to a user or other device are described in U.S. patent application Ser. No. 13/340,126 filed Dec. 29, 2011 issued as U.S. Pat. No. 9,084,058, U.S. patent application Ser. No. 13/536,250 filed Jun. 28, 2012 issued as U.S. Pat. No. 9,225,307, U.S. patent application Ser. No. 13/568,993 filed Aug. 7, 2012 issued as U.S. Pat. No. 8,930,005, U.S. patent application Ser. No. 13/777,780 filed Feb. 26, 2013 issued as U.S. Pat. No. 9,195,432, U.S. application Ser. No. 14/475,191 filed Sep. 2, 2014, and U.S. patent application Ser. No. 14/681,735 filed Apr. 8, 2015, the contents of which are all incorporated by reference in their entireties.

The method may proceed to block 808 to determine whether the selected zone (e.g., default zone or device(s) or dynamically selected zone or device(s)) is grouped with an additional zone as discussed above. If the selected zone is not grouped with another zone, the system 500 can cause the selected zone which can include one or more response devices to play the audio response at block 810. The audio response may be generated or stored in the device playing the audio response and/or the audio response may be transmitted from any other device in system 500 over any of communication paths 542, 544, 546 to the device playing the audio response. The audio response may be received in a message from other devices and/or the selected response device(s) may receive a message from a device processing the voice command (e.g., any device in system 500) containing an identifier that corresponds to the particular audio response to play.

In some aspects, the system may determine that the selected zone (e.g., predetermined zone, default zone, dynamically selected zone) or the selected device(s) (e.g., predetermined device, default device, dynamically selected device) are in a zone that is grouped with another zone and proceed to block 812. For example, the selected zone and the additional zone grouped with the selected zone may be playing audio content synchronously (e.g., playing the same audio content simultaneously in sync). While receiving the voice command processing the voice command, and/or playing the audio response to the voice command, playback of currently playing media items or audio content (e.g., songs, playlist, radio station, video) may continue uninterrupted while the audio response is played from device(s) of the selected zone. Meanwhile, any media item or audio content which is to be played as a result of an audio or voice command may be played in the selected zone in addition to any other zones grouped with the selected zone. For example, the voice command may be a request to play a particular song, and while the voice command is processed and the song is requested, audio playback of any currently playing audio content may continue while audio responses are played by the dynamically selected or predetermined response device(s). Once the voice command is processed and the requested song is identified and retrieved, playback by all playback devices of the selected zone and any zones grouped with the default zone may change to the requested song.

In some aspects, all playback devices in the same zone as the response device and zones grouped with the response device may play the audio response. The determination of whether the audio response is to be played in these zones may be based on context information (e.g., user presence). For example, if the selected response device(s) are in a first zone that is grouped for synchronous audio playback with a second zone, the system may determine that user(s) are present in the second zone and play the audio response to notify other user(s) that a received voice command is causing a change in the playback state.

In some aspects, more than one audio response may be provided for a single voice command. For example, a first audio response may be played in response to a device of the plurality of devices 500 receiving a voice command to provide acknowledgment or notification to the user that the voice command has been received, and a second audio response may be played in response to processing and/or completion of processing of the voice command. The first audio response and second audio response may be played on any combination of one or more predetermined devices or dynamically selected devices. For example, a user may speak a voice command of playing to play a "Top 40 Playlist," and a default audio response device may play a first audio response (e.g., tone, ringtone, notification sound, sound clip) indicating that the voice command has been received by a NMD (e.g., NMD associated with the default zone). In response to receiving an indication that the voice command is being processed or processing is complete, a second audio response, such as "The Top 40 Playlist is now being played," may be generated and/or received. The second audio response may be played on a dynamically selected device. The various blocks of FIGS. 7 and 8 may be repeated, as needed, for additional audio commands and/or audio responses.

In some aspects, the selected one or more response devices may adjust the playback volume of the audio response based on various factors. Some of the response device(s) may already be set at a particular volume level before receiving the voice command and/or before playing the audio response, and the response device(s) may play the audio response at the particular volume level. The response device(s) may be set at the particular volume level even though the response device(s) might not be currently playing any media content. The audio response to the voice command may be played at a volume greater than, less than, or equal to the particular volume level.

In some instances, the system may determine that the selected one or more zones are still some distance from the user, and the system may play the audio response at a louder volume so that the user can hear the audio response. For example, the system may have selected a playback device in the kitchen zone because the kitchen playback device(s) is closest to the user, but the user may be located outside in the backyard where there is no playback device. In order for the user to hear the audio response from the playback device, the audio response may need to be played at a greater volume. The volume of the audio response may be independent of the volume or loudness at which media content may be played. In this instance, the NMD may also be in the kitchen zone, and the system may determine to use an inverse relationship between the loudness of the user's voice as received by the NMD and volume of the audio response playback.

The determination of whether to adjust the playback volume may depend on context information such as user location and/or user presence information. For example, the system may have determined that the user is greater than a threshold distance from the selected playback device or is the user is in a particular zone which may be predetermined to be at a distance where volume of audio response playback is to be adjusted. In some aspects, the system might not increase the volume of the audio response playback above a threshold volume level if the system determines that another person or use is in the selected zone.

In some aspects, the system may use other context information such as the time of day, day of the week, and/or volume of currently played media content when determining the volume at which to play the audio response. The other context information may be used to distinguish from whether the user is at a distance from the NMD or whether the user is providing a voice command at a low volume (e.g., whisper). For example, the time of day may be the evening or late at night when other users in same location may be sleeping. The user may not wish to disturb other users who are sleeping and may therefore provide a voice command at a low volume. Based on the time of day being after a certain time (e.g., 9 pm), the system may determine to switch to a special mode such as a night mode and play the audio response at the same or around the same volume at which the NMD received the voice command. In some aspects, a user may be provided an option to use the night mode via a control device. In yet another example, sleeping times may be more flexible on weekends, and therefore the system may determine that even though the time of day is after a certain time, the system might not use a night mode because the day is a weekend.

Another example may be to determine the volume of the audio response based in part on the volume at which the currently playing music may be played. For example, the system may decide to automatically use a night mode audio response volume when the volume of music is set below or equal to a threshold volume level. The user may be playing music at a lower volume so as to not disturb other people who may be within hearing range at a higher volume. In this example, there may be a direct correlation between the volume of the music playback and/or the loudness of the user's voice and the volume of the audio response.

The system may receive context information from other devices in the environment such as presence information and/or location information of people in the environment using various techniques described herein. The system may determine that the volume at which an audio response is to be played may be changed from current volume settings based on the context information and/or location information.

The audio response playback volume may be adjusted independent of or in combination with an adjustment of the playback volume of media content during the audio response playback period, or the playback volume of media content may be adjusted during the audio response playback period as described in U.S. application Ser. No. 15/098,760 filed Apr. 14, 2016 and entitled "Content Mixing," the contents of which are incorporated by reference.

In causing the selected one or more playback devices to play an audio response with an adjusted volume, a playback device of the one or more playback devices and/or one or more computing devices in cloud network 502 may determine the adjusted volume. For example, one or more of the computing devices in cloud network 502 may determine the adjusted volume (e.g., volume level, gain level, gain adjustment amount) and transmit the adjust volume information to the selected one or more playback devices. In another example, the selected one or more devices may determine the adjusted volume.

While the features described herein address selecting one or more devices to play an audio response to a voice command, the selected one or more devices may provide a visual indication as a response to the voice command instead of or in addition to playing the audio response.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method, comprising:

receiving, via a computing device from a microphone device associated with a media playback system, a voice command, wherein the media playback system comprises one or more zones;

selecting, via the computing device, an audio response zone from the one or more zones to play an audio response based on context information, wherein the selected zone comprises one or more playback devices;

based on capability information, determining whether to select a predetermined zone as a first zone or to dynamically select a zone of the one or more zones as the first zone, wherein selecting the first zone of the one or more zones to play the audio response comprises selecting the predetermined zone as the audio response zone to play the audio response based on pairing information of the microphone device; and causing, via the computing device, at least one playback device of the one or more playback devices of the selected zone to play the audio response.

2. The method of claim 1, further comprising:

determining to dynamically select a zone of the one or more zones as the audio response zone; and wherein selecting the audio response zone from the one or more zones to play the audio response based on context information comprises:

dynamically selecting the first zone of the one or more zones as the audio response zone to play the audio response based on context information.

3. The method of claim 2, wherein dynamically selecting the first zone based on context information comprises:

dynamically selecting the first zone based on context information collected after receiving the voice command.

4. The method of claim 1, further comprising:

determining that the media playback system lacks one or more hardware devices; and based on determining that the media playback system lacks the one or more hardware devices, determining to select the predetermined zone as the first zone.

5. The method of claim 1, further comprising:

determining that the audio response zone is grouped for synchronous playback with a second zone; and wherein causing at least one playback device of the one or more playback devices of the selected zone to play the audio response comprises:

causing only the audio response zone to play the audio response.

6. The method of claim 1, further comprising:

adjusting a volume level of playback of the audio response based on the context information.

7. A tangible, non-transitory computer-readable medium having stored thereon instructions that when executed by a processor cause a computing device to perform functions comprising:

receiving, from a microphone device associated with a media playback system, a voice command, wherein the media playback system comprises one or more zones;

selecting an audio response zone from the one or more zones to play an audio response based on context information, wherein the selected zone comprises one or more playback devices;

based on capability information, determining whether to select a predetermined zone as a first zone or to dynamically select a zone of the one or more zones as the first zone, wherein selecting the first zone of the one or more zones to play the audio response comprises selecting the predetermined zone as the audio response zone to play the audio response based on pairing information of the microphone device; and causing at least one playback device of the one or more playback devices of the selected zone to play the audio response.

8. The computer-readable medium of claim 7, wherein the functions further comprise:

determining to dynamically select a zone of the one or more zones as the audio response zone; and wherein selecting the audio response zone from the one or more zones to play the audio response based on context information comprises:

dynamically selecting the first zone of the one or more zones as the audio response zone to play the audio response based on context information.

9. The computer-readable medium of claim 8, wherein dynamically selecting the first zone based on context information comprises:

dynamically selecting the first zone based on context information collected after receiving the voice command.

10. The computer-readable medium of claim 7, the functions further comprise:

determining that the media playback system lacks one or more hardware devices; and based on determining that the media playback system lacks the one or more hardware devices, determining to select the predetermined zone as the first zone.

11. The computer-readable medium of claim 7, the functions further comprise:

determining that the audio response zone is grouped for synchronous playback with a second zone; and wherein causing at least one playback device of the one or more playback devices of the selected zone to play the audio response comprises:

causing only the audio response zone to play the audio response.

12. The computer-readable medium of claim 7, the functions further comprise:

adjusting a volume level of playback of the audio response based on the context information.

13. An apparatus, comprising:

a processor; and a memory having stored thereon instructions that when executed by the processor cause the apparatus to perform functions comprising:

receiving, from a microphone device associated with a media playback system, a voice command, wherein the media playback system comprises one or more zones;

selecting an audio response zone from the one or more zones to play an audio response based on context information, wherein the selected zone comprises one or more playback devices;

based on capability information, determining whether to select a predetermined zone as a first zone or to dynamically select a zone of the one or more zones as the first zone, wherein selecting the first zone of the one or more zones to play the audio response comprises selecting the predetermined zone as the audio response zone to play the audio response based on pairing information of the microphone device; and causing at least one playback device of the one or more playback devices of the selected zone to play the audio response.

14. The apparatus of claim 13, wherein the functions further comprise:

determining to dynamically select a zone of the one or more zones as the audio response zone; and wherein selecting the audio response zone from the one or more zones to play the audio response based on context information comprises:

dynamically selecting the first zone of the one or more zones as the audio response zone to play the audio response based on context information.

15. The apparatus of claim 13, the functions further comprise:

determining that the media playback system lacks one or more hardware devices; and based on determining that the media playback system lacks the one or more hardware devices, determining to select the predetermined zone as the first zone.

16. The apparatus of claim 13, the functions further comprise:

determining that the audio response zone is grouped for synchronous playback with a second zone; and wherein causing at least one playback device of the one or more playback devices of the selected zone to play the audio response comprises:

causing only the audio response zone to play the audio response.

17. The apparatus of claim 13, the functions further comprise:

adjusting a volume level of playback of the audio response based on the context information.

* * * * *